(12) United States Patent
Aitchison et al.

(10) Patent No.: US 6,507,156 B2
(45) Date of Patent: Jan. 14, 2003

(54) DISPLAY

(75) Inventors: Brad Aitchison, Beaverton, OR (US);
Terrance S. Larsson, Sherwood, OR (US); Tin Nguyen, Beaverton, OR (US); Kelly Petlig, Portland, OR (US);
Steven F. Wald, Tualatin, OR (US)

(73) Assignee: Planar Systems, Inc., Beaverton, OR (US)

( * ) Notice: Subject to any disclaimer, the term of this patent is extended or adjusted under 35 U.S.C. 154(b) by 0 days.

(21) Appl. No.: 09/834,386

(22) Filed: Apr. 13, 2001

(65) Prior Publication Data
US 2002/0140362 A1 Oct. 3, 2002

Related U.S. Application Data

(60) Provisional application No. 60/204,920, filed on May 16, 2000.

(51) Int. Cl.[7] ............................. G09G 3/10; G09G 3/30
(52) U.S. Cl. ...................................... 315/169.1; 345/77
(58) Field of Search ........................... 315/169.1, 169.2, 315/169.3, 169.4; 345/55, 76, 77, 89, 92

(56) References Cited

U.S. PATENT DOCUMENTS

| 5,635,110 A | * | 6/1997 | Chadha et al. | 252/301.4 R |
|---|---|---|---|---|
| 5,652,600 A | * | 7/1997 | Khormaei et al. | 345/76 |
| 5,952,789 A | * | 9/1999 | Stewart et al. | 315/169.1 |
| 6,034,659 A | * | 3/2000 | Wald et al. | 315/169.3 |
| 6,191,535 B1 | * | 2/2001 | Saitou | 315/169.3 |
| 6,243,072 B1 | * | 6/2001 | McKnight | 345/600 |
| 6,278,423 B1 | * | 8/2001 | Wald et al. | 345/205 |
| 6,356,029 B1 | * | 3/2002 | Hunter | 315/169.1 |
| 6,373,454 B1 | * | 4/2002 | Knapp et al. | 315/169.3 |

\* cited by examiner

*Primary Examiner*—Don Wong
*Assistant Examiner*—Minh D A
(74) *Attorney, Agent, or Firm*—Chernoff Vilhauer McClung & Stenzel, LLP

(57) ABSTRACT

An active matrix electroluminescent device provides a gray scale display. The device comprises a first electrode layer including a plurality of individually addressable pixel electrodes, a second electrode layer, and a stack including at least a phosphor layer which produces light upon the application of an electric field across the phosphor layer and a dielectric layer. The stack is disposed between the first and second electrode layers. The second electrode layer is driven during the first subframe time period with a first illumination signal having a first amplitude. At least one of the set of the selected ones of the pixel electrodes is selected with data signals during a subsequent subframe time period of the frame. The second electrode layer is driven,during the subsequent subframe time period with a subsequent illumination signal having a second amplitude or third amplitude where the subsequent amplitude or third amplitude is different than the first amplitude or different than the first amplitude and second amplitude.

41 Claims, 11 Drawing Sheets

| HIGH VOLTAGE TRANSISTOR | TRANSPARENT ELECTRODE | PHOSPHOR LAYER VOLTAGE |
|---|---|---|
| ON |  |  |
| OFF |  |  |

DISPLAY

This application claims the benefit of U.S. patent Ser. No. 60/204,920, filed May 16, 2000.

BACKGROUND OF THE INVENTION

The present invention relates to a thin film electroluminescent device for providing a gray scale display.

Traditional thin film electroluminescent displays (TFEL) are typically constructed of a laminar stack comprising a set of transparent front electrodes, which are typically made of indium tin oxide, formed on a transparent substrate (glass), and a transparent electroluminescent phosphor layer sandwiched between front and rear dielectric layers situated behind the front electrodes. Disposed behind the rear dielectric is layer are rear electrodes orientated perpendicular to the front electrodes. To illuminate an entire display, each row electrode is sequentially scanned and selected column electrodes are simultaneously energized with voltage pulses to illuminate selected pixels in a row. All rows are scanned in turn until the entire display has been illuminated thereby writing a frame of video data. This is sometimes referred to as frame time addressing.

For monochrome and color displays a gray scale is a desirable feature in order to display video and graphic images with better screen clarity and definition. Current techniques to achieve a gray scale for thin film electroluminescent displays can be broadly categorized as those calling for modulation of the amount of charge flow through the phosphor layer. The present modulation techniques may be further divided into two subcategories, namely, amplitude modulation and pulse width modulation. These techniques have been used with traditional electroluminescent displays to achieve a gray scale.

Amplitude modulation is the modulation of the magnitude of the voltage pulses imposed across the electroluminescent layer. Different voltage pulse magnitudes within the operating range of the electroluminescent layer, which is typically 160 volts to 250 volts, cause different pixel brightness. Within certain limits a higher voltage pulse causes a greater amount of light to be emitted than a lower voltage pulse. Pulse width modulation is a single voltage pulse of a selected time duration imposed across the electroluminescent layer during each frame to control the amount of light emitted from the pixel, which increases with increased duration of the voltage pulse. Both of these techniques are readily applied to an entire display by applying a voltage pulse to a row electrode and using varied magnitudes or duration of voltage pulses applied to the column electrodes thereby creating a gray scale display in a row by row manner.

Both of these modulation techniques control the charge transported through the electroluminescent layer to achieve a gray scale display, but the resulting optical performance and accuracy obtainable is not sufficient for the high number of luminescent levels desired in a true high resolution gray scale display. The electroluminescent layer has a nonlinear voltage versus luminescence curve that makes it difficult to obtain a desired luminescent output from the electroluminescent layer with different applied voltage pulse levels. Even if the applied voltage pulse levels are modified in some manner to compensate for such non-linearities, the voltage versus luminescence curve tends to shift from location to location within a display and also varies from display to display. Additionally, individual pixels within the display may exhibit a voltage coupling to other pixels, which changes the actual voltage at a particular pixel, thereby changing the luminescence of the selected pixel. Furthermore, the voltage coupling varies with the particular pattern of voltages supplied to the entire display at any particular moment. The voltage coupling and the nonlinear voltage versus luminescence curve are especially prominent at low and intermediate voltage levels. These problems make it difficult to design displays with a high gray scale which requires accurate luminescence levels.

The refresh rates obtainable with traditional thin film electroluminescent displays are limited by the time required to address and illuminate each row within the display in a sequential manner by providing a single voltage pulse to a row electrode and a voltage pulse to selected column electrodes. After an entire display is refreshed by addressing and illuminating each selected pixel in a row by row manner, the process is repeated. The illumination rate (the rate at which voltage pulses are applied across the electroluminescent layer of the entire display to illuminate each pixel) is limited by the time required to address each pixel in a row-by-row manner, because the illumination and addressing functions of the display are combined. A typical display is refreshed at 60 Hz. Thus, frequency modulation techniques are not easily adaptable to conventional drive techniques because if the refresh rate falls too low, flickering will result and higher frame rates are limited by the RC time constants of the display.

Khormaei, et al., U.S. Pat. No. 5,652,600, disclose a time multiplexed gray scale approach for an active matrix electroluminescent display, described in detail later. Khormaei, et al. suggest a gray scale technique that includes illuminating the display during different subframe time periods, where the predetermined characteristics of the illumination signal are changed between the different subframe time periods. Khormaei, et al. also suggest an initial pulse of a reduced amplitude to increase the number of subframe time periods obtainable within a predetermined time period. Unfortunately, when using the reduced amplitude pulse the brightness of the display tends to vary from display to display and changes within the same display over time. The variable brightness when using the reduced amplitude initial pulse is simply unacceptable for a high performance gray scale display.

SUMMARY OF THE INVENTION

The present invention overcomes the aforementioned drawbacks of the prior art by providing a method of illuminating an active matrix electroluminescent device to provide a gray scale display. The device comprises a first electrode layer including a plurality of individually addressable pixel electrodes, a second electrode layer, and a stack including at least a phosphor layer which produces light upon the application of an electric field across the phosphor layer and a dielectric layer. The stack is disposed between the first and second electrode layers. The gray scale is provided by selecting a set of selected ones of the pixel electrodes with data signals during a first subframe time period of a frame. The second electrode layer is driven during the first subframe time period with a first illumination signal having a first amplitude. At least one of the set of the selected ones of the pixel electrodes is selected with data signals during a subsequent subframe time period of the frame. The second electrode layer is driven during the subsequent subframe time period with a subsequent illumination signal having a second amplitude, where the subsequent amplitude is different than the first amplitude. At least one of the set of the selected ones of the pixel electrodes is selected with data signals during a further subsequent subframe time period of the frame. The second electrode layer is driven during the further subsequent subframe time period with a further subsequent illumination signal having a third amplitude, where the third amplitude is different than the first amplitude and the second amplitude.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
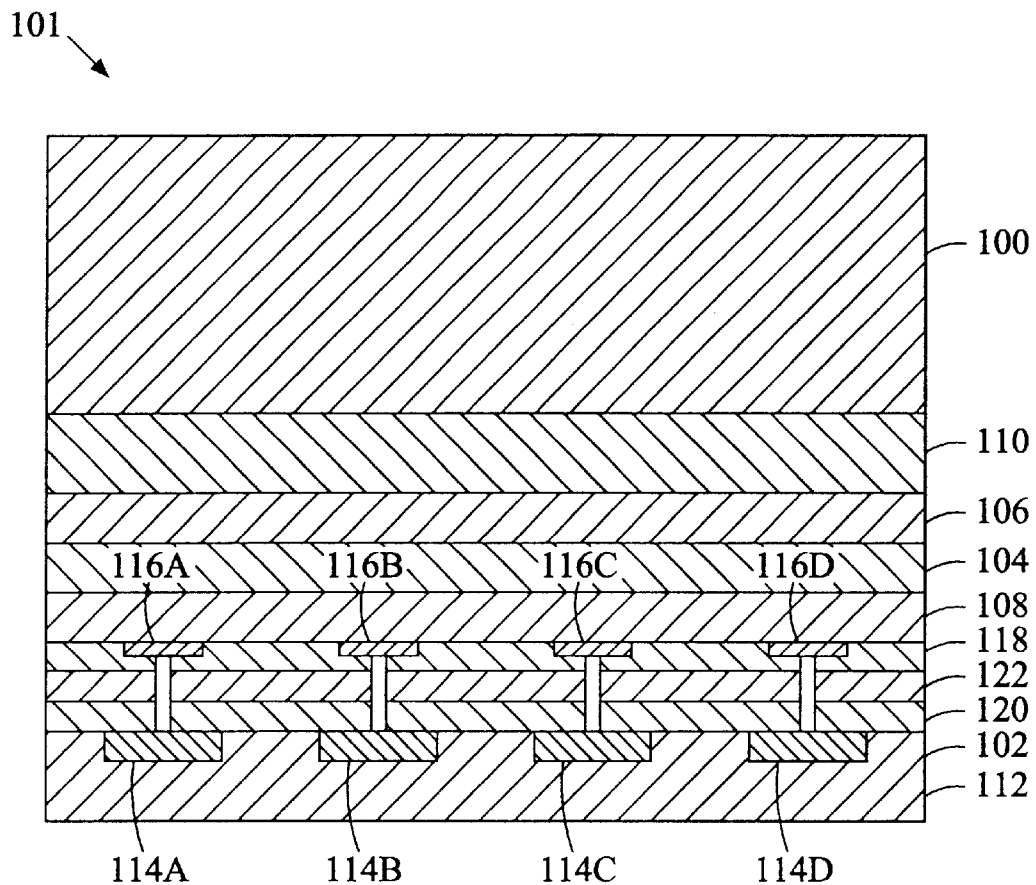
FIG. 1 is an exemplary embodiment of an active matrix electroluminescent device.

Referring to FIG. 1, an active matrix electroluminescent device (AMEL) 101 is constructed using an inverted structure. The structure includes a transparent electrode 110, a circuit layer 102, and at least three layers including an electroluminescent phosphor layer 104 sandwiched between front and rear dielectric layers 106, 108, respectively. Alternatively, either the rear or the front dielectric layer may be omitted. The three layers 104, 106, 108 are disposed between the circuit layer 102 and a transparent electrode layer 110. The circuit layer 102 is deposited on a rearwardly disposed substrate 112. The rearwardly disposed substrate 112 is preferably silicon in which the circuit layer 102 is fabricated. A glass plate (transparent material) 100 is affixed on the transparent electrode 110. The plate functions as a moisture barrier and a protective cover for the device. Individual circuit elements 114a, 114b, 114c, and 114d are connected to respective pixel electrodes 116a, 116b, 116c, and 116d, with a metal line connected through a hole. The hole is normally a via through auxiliary layers 118, 120, and 122. The auxiliary layers include a first isolation layer 118, a second isolation layer 120, and a conductive layer 122, preferably made of refractory materials. The auxiliary layers may be omitted, if desired. It is to be noted that the circuit layer 102 may includes layers 118, 120, and 122, if desired.

Figure 2:
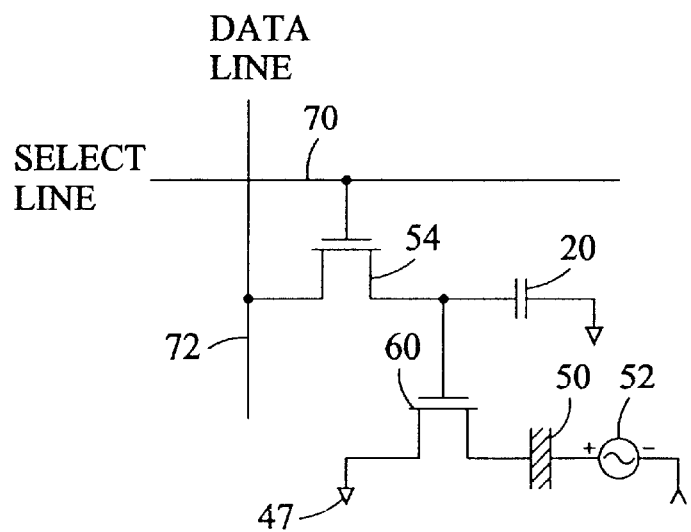
FIG. 2 is an exemplary embodiment of a circuit design for the device of FIG. 1.

FIG. 2 is an exemplary embodiment of a circuit design 114d, which involves a high voltage transistor 60 operating in a breakdown region, and a capacitor 20 and the high voltage transistor 60 connected to a ground layer 47. The electroluminescent stack is represented by capacitor 50 and a driving voltage 52 applied to the transparent electrode 110.

Figure 3:
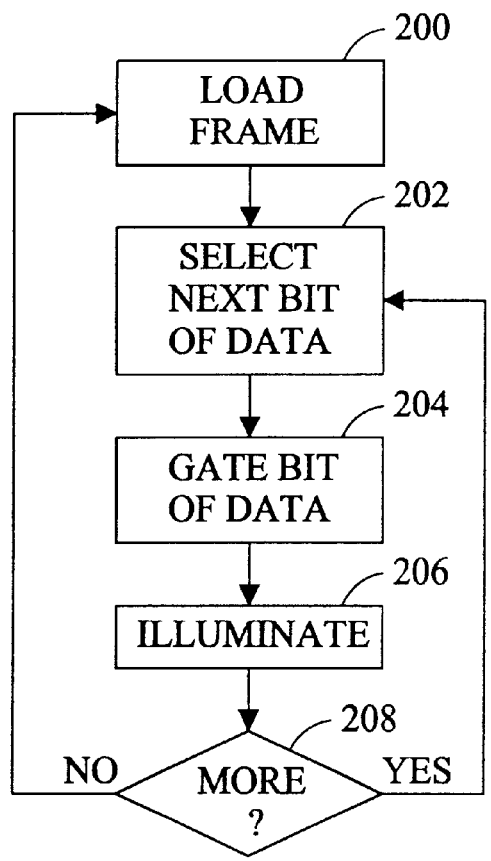
FIG. 3 is an exemplary flow chart for achieving a gray scale for the device of FIG. 1.

FIG. 3 is an exemplary flow chart for achieving a gray scale display in accordance with the present invention. Each frame of data consisting of a plurality of subframes which contains one data bit of gray scale information is loaded into memory at block 200 representative of the desired luminance for each individual pixel of the display. Preferably, the data bits are arranged in order of most significant bit to the least significant bit representative of a numerical value. Alternatively, the data may be arranged in any predetermined order or even a random order. A data bit is selected at bock 202 from the illumination of a pixel. At block 204, the data from the gating device 54 is coupled to the high voltage transistor 60 by activation of the select line 70 coupled to the gating device 54. The high voltage transistor 60 is activated depending upon the value of the data imposed upon a capacitor 20. At block 206, an illumination signal energizes the transparent electrode 110 which in turn illuminates respective pixels associated with high voltage transistors that are turned on. Block 208 checks to see if all subframes within the frame have been completed. If there are additional subframes then the next set of data is loaded into the circuit layer at block 202. If there are no additional subframes then the next frame is loaded.

Figure 4:
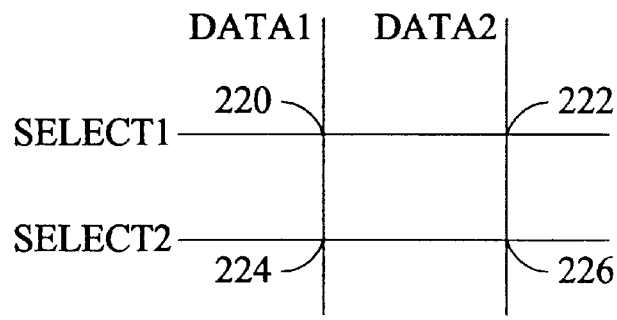
FIG. 4 is an exemplary four node display having two data lines and two select lines for the device of FIG. 1.
Figure 5:
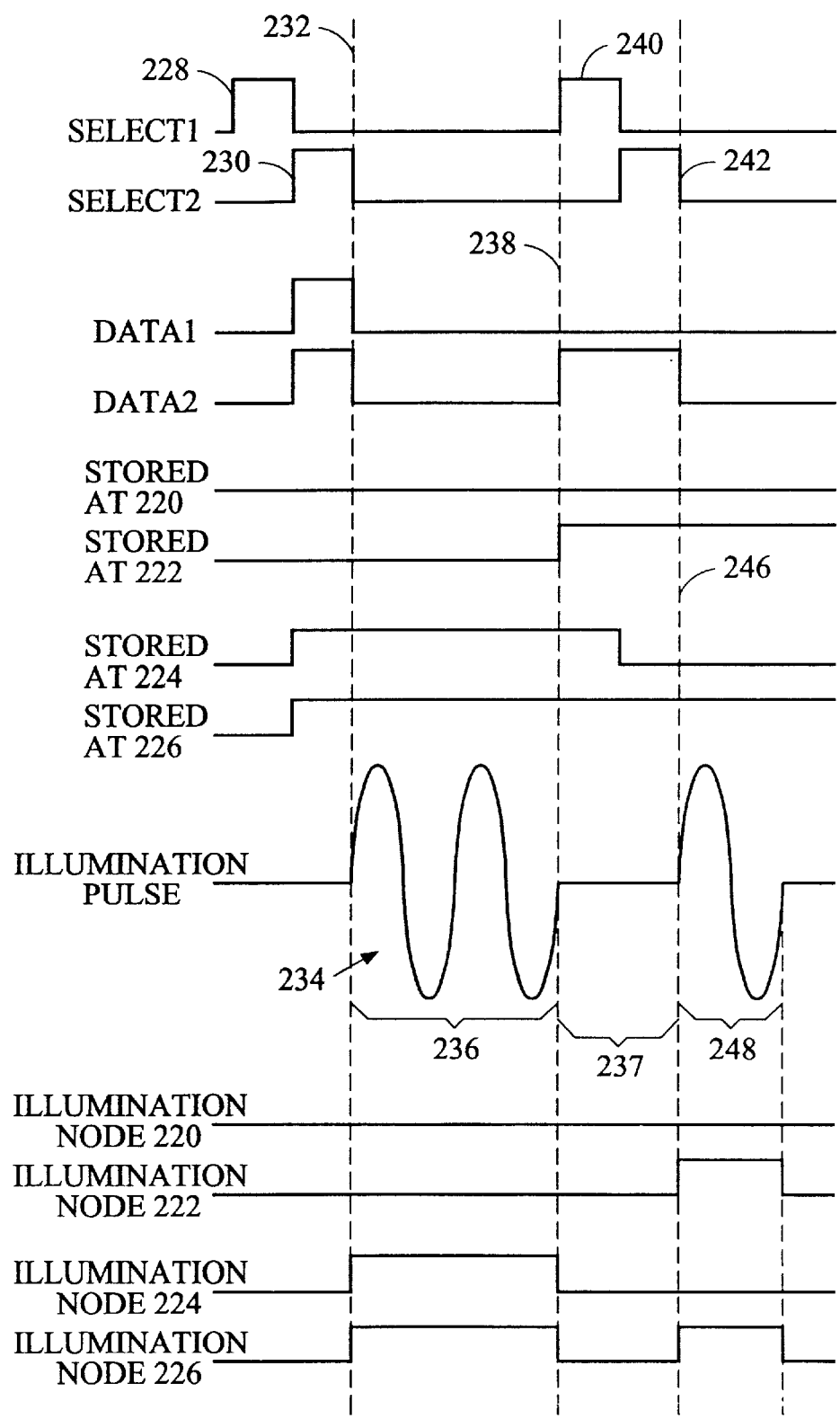
FIG. 5 is an exemplary timing diagram for the flow chart of FIG. 3.

FIG. 5 is an exemplary timing diagram of a two data bit (subframe) for a four node 200, 222, 224, 226 display having two data lines (data1, data2) and two select lines (select1, select2) as shown in FIG. 4. Select1 is activated with a voltage pulse 228 while both data1 and data2 have low voltages, resulting in a low voltage stored at node 220 and node 222. Next, select 1 is deactivated and select2 is activated with a voltage pulse 230 while data1 and data2 both have a high voltage, resulting in a high voltage stored at node 224 and node 226. At this point in time after an addressing period of time, all the data for the nodes 220, 222, 224, 226 have been gated from the gating device 54 to the high voltage transistor 60 for the illumination of selected pixels. The data is maintained by the memory characteristic of the pixel circuit. At time 232 the front electrodes 110 are energized with a series of illumination pulses 234 for a predetermined period of time 236 illuminating nodes 224 and 226, which were selected. The front electrodes 110 are then deactivated at time 238 and the next subframe of data bits is loaded with the second bit of information from the respective frame for each pixel, to each pixel within the display, during an addressing period of time 237. Select1 is activated with a voltage pulse 240 while data1 and data2 respectively have low and nigh voltages, resulting in node 220 having a low voltage and node 222 having a high voltage. Select1 is deactivated and select2 is activated with a voltage pulse 242 while data1 has a low voltage and data2 has a high voltage, resulting in a low voltage at node 224 and a high voltage at node 226. After the addressing period 237, the illumination pulse is activated at time 246 for a period of time 248 illuminating nodes 222 and 226 which were selected.

As illustrated in FIG. 5, with two data bits there are four gray levels that can be generated. In this example, the illumination period 236 is twice the illumination period 248. Node 220 has a 0 gray level because it was never illuminated. Node 222 has a gray level of 1 because it was illuminated only during the shorter illumination period 248. Node 224 has a gray level of 2, which is twice that of node 222, because it was illuminated only during the longer illumination period 236. Node 226 has a gray level of 3 because it was illuminated during both illumination periods 236 and 248. The subframes may be selected in any order.

The separation of the addressing function of the pixels from the illumination function, permits the loading of the entire (or a portion thereof) display and the simultaneous illumination of the entire display. Depending on the circuit design, the addressing and the illumination may be performed simultaneously.

Figure 6:
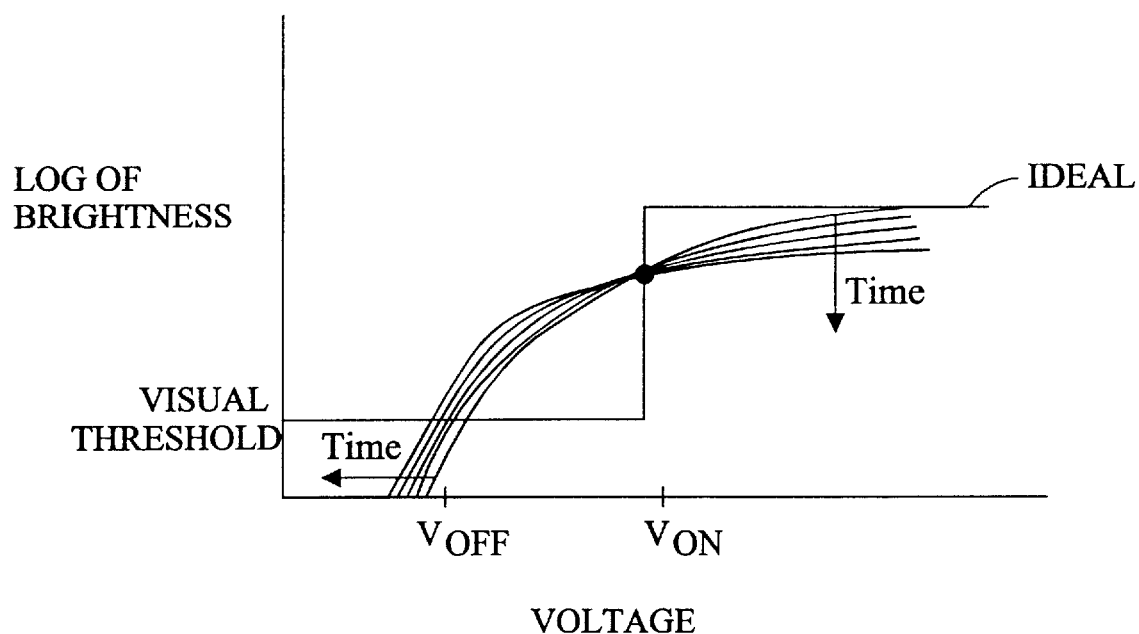
FIG. 6 is a graph of the light emission characteristics of electroluminescent phosphor illustrating the aging effect.

Unfortunately, the technique illustrated in FIG. 5 together with a reduced amplitude pulse results in a display where the brightness tends to vary from display to display and changes within the same display over time, as described in the background. The variable brightness when using the reduced amplitude initial pulse is simply unacceptable for a high performance gray scale display. In order to understand this phenomena the present inventors initially considered the aging characteristics of electroluminescent phosphor material. The ideal electroluminescent light emission characteristics includes a constant brightness above $V_{ON}$ and no light output below $V_{OFF}$. The brightness between $V_{OFF}$ and $V_{ON}$ is typically of no concern because the electroluminescent phosphor material is not normally driven at these voltages. Referring to FIG. 6 in contrast to the ideal electroluminescent light emission characteristics, actual phosphor material tends to increase in brightness along a curve from a voltage range generally around $V_{OFF}$ to a voltage range generally greater than $V_{ON}$. In addition, depending on the total duration during which the phosphor material of the display has been illuminated, the brightness versus voltage electroluminescent phosphor characteristics change. Moreover, depending upon the particular images displayed on the display and the localized characteristics of the phosphor material, each pixel within the phosphor material likewise ages in a non-uniform manner. This may result in undesirable "ghost" images and "latent" images appearing on the display. Depending upon the particular aging characteristics of the phosphor material for a set of selected pixels, the voltage applied across the entire display may result in multiple different luminescent levels for the selected pixels. In other words, the light output for the selected pixels will not be uniform when uniformity is desired. The variable brightness versus voltage curves are generally relatively constant at a particular voltage, such as $V_{ON}$, and accordingly this voltage is typically selected as the ON voltage level to achieve relatively uniform light output across the display. The $V_{OFF}$ voltage level is likewise relatively constant and may be used with some confidence for the anticipated output. To select intermediate driving voltage levels and yet still achieve predictable light output over extended time periods is fraught with problems and not previously considered feasible.

Figure 7:
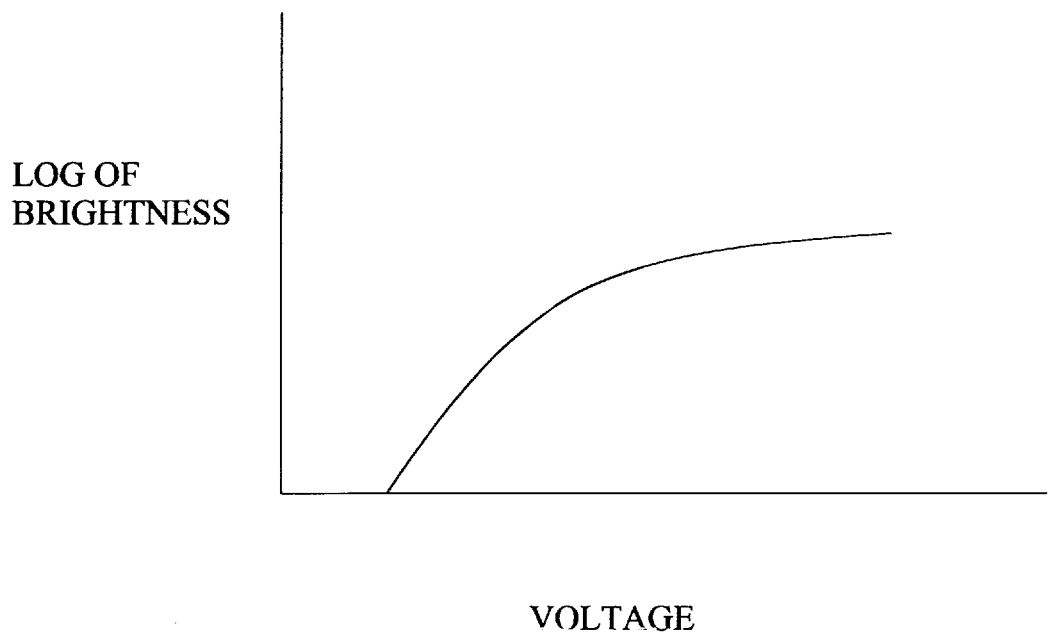
FIG. 7 is a graph of the light emission characteristics of electroluminescent phosphor with stable aging characteristics.

Referring to FIG. 7, one attempt to overcome the undesirable intermediate voltage aging characteristics is to select phosphor material that is thought to be "stable" after the initial aging period. The "stable" aging curve of the phosphor material is then characterized and the desired number of gamma corrected gray levels, such as 256, are selected. If the pulse scheme as taught by Khormaei, et al. is used, it would require a set of pulses on the order of 255 to achieve 256 gray levels. Unfortunately, the duration required for 256 pulses would normally exceed the time period permitted during each frame with individual pulses around 200 us in duration and the energy required is excessive.

With a gray scale scheme based on increased number of pulses not feasible, the present inventors determined that another gray scale scheme is desirable. The present inventors came to the realization that with a stable brightness versus voltage curve the single reduced amplitude pulse, taught by Khormaei, et al. (U.S. Pat. No. 5,652,600) may be extended to multiple variable amplitude pulses to achieve a greater number of gray levels. With the phosphor aging problem previously thought to be solved, the present inventors started to drive the electroluminescent phosphor material at multiple intermediate voltage levels to reduce the number of pulses required for a frame. Unfortunately, when attempting to drive the electroluminescent phosphor material at intermediate voltage levels the inventors were astonished to observe that the phosphor material was in fact not stable when driven at intermediate voltage levels. In other words, when the electroluminescent phosphor material thought to be stable is driven at intermediate voltage levels it in fact does age. Accordingly, the present inventors believed that existing phosphors are only relatively stable at the $V_{ON}$ and $V_{OFF}$ voltage levels. The aging generally occurs over a time duration in the range of 100 to 1,000 hours.

After further analysis the present inventors were likewise astonished to notice that the brightness versus voltage curve tends to shift over a much shorter time duration depending on the gray levels displayed. This gray level dependance tends to be observable when displaying a particular gray level for a few seconds to a few hours. In other words, the electroluminescent phosphor of the display appears to include a memory effect that manifests itself after a few seconds to a few hours depending on the particular gray scale displayed. For example, the following gray levels for two different pixels with a value of "8" will provide different luminance outputs. The first gray level is displayed for a few seconds to a few hours and then switched to the second gray level.

| Pixel Number | First Gray Level | Second Gray Level |
| --- | --- | --- |
| 1 | 128 | 8 |
| 2 | 0 | 8 |

In essence, the output levels of the electroluminescent phosphor layer exhibits different brightness levels at a particular gray level depending upon the amount of time previous gray levels were displayed.

Figure 8:
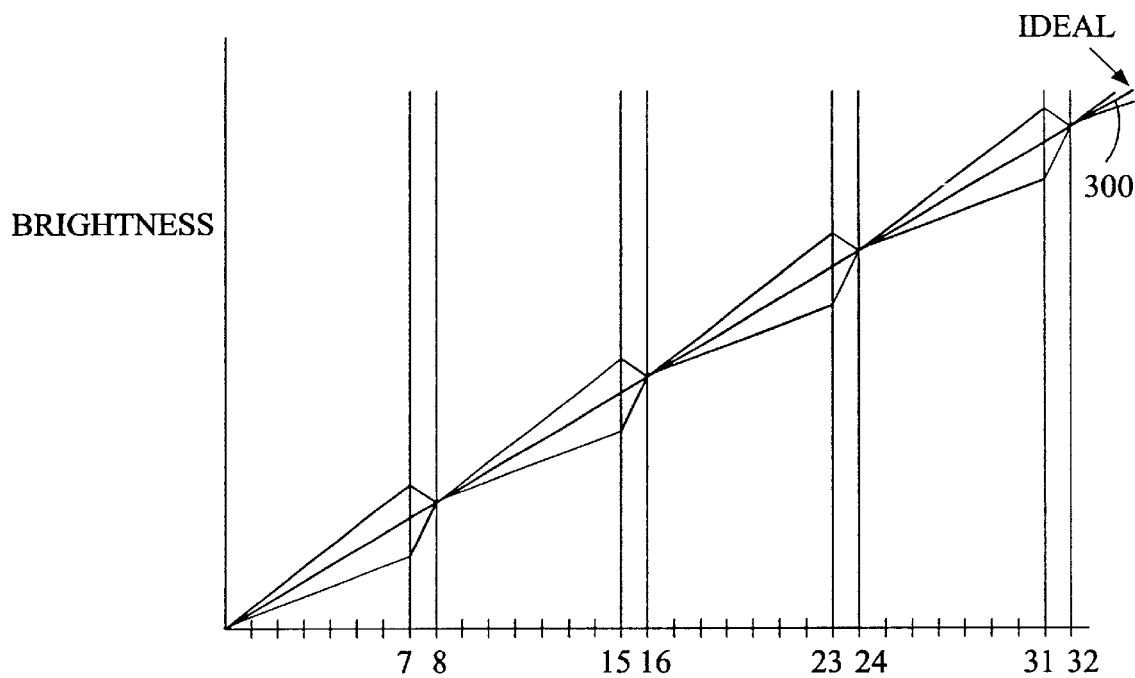
FIG. 8 is a graph of the brightness versus gray levels for a multiple pulse modulated technique.
Figure 8:
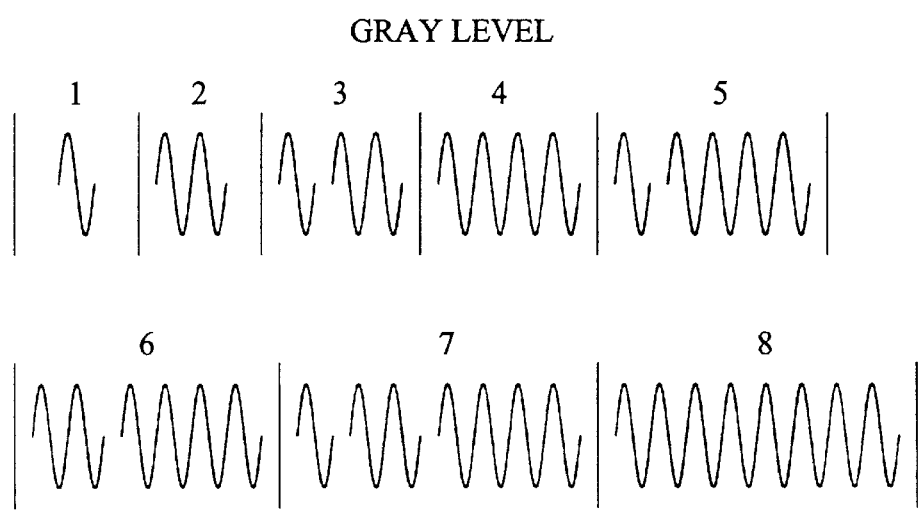

Within a frame it would be anticipated that with an ever increasing binary gray level set of pulses (e.g., 1, 2, 4, 8, 16, 32) would increase the light output proportionally as shown by line 300 in FIG. 8. To the further surprise of the present inventors the actual measured luminance output of the display when using the temporal gray scale technique, such as that described by Khormaei et al. (U.S. Pat. No. 5,652,600), is saw toothed. The abrupt changes in brightness output between selected respective gray levels, such as between ⅞, 15/16, 23/24, and 31/32, are readily noticeable and objectionable to viewers.

Figure 9:
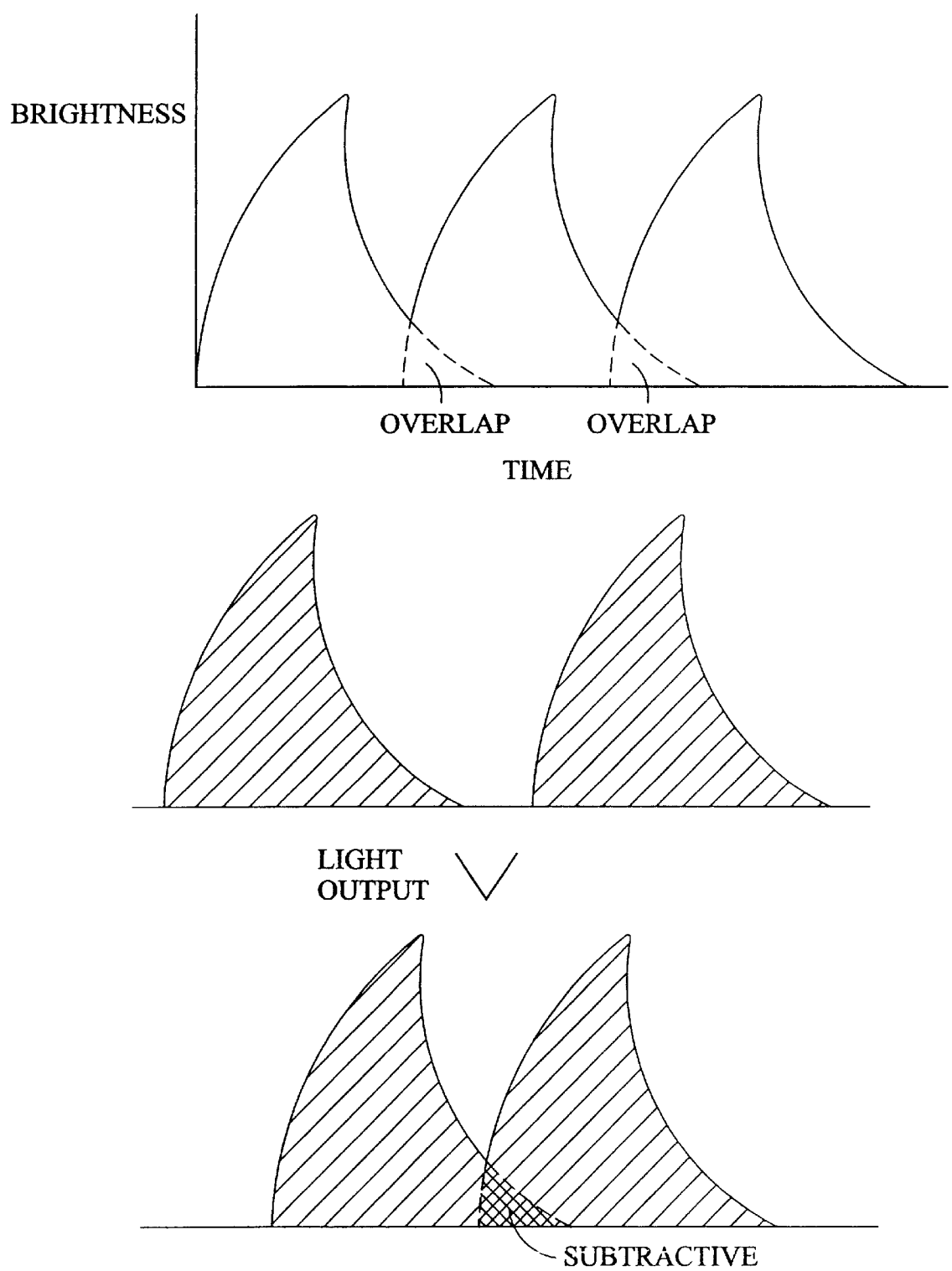
FIG. 9 is a graph of the brightness of multiple pulses versus multiple sufficiently spaced apart single pulses.

Referring to FIG. 9, after further consideration the principal reason for the sharp change in the luminance between particular bit planes using the technique illustrated in FIG. 8 results from the existence of significant brightness overlap between successive pulses. The region of overlap between successive pulses is in effect subtracted from the overall brightness output. Accordingly, the light output resulting from two pulses, where significant light output is overlapping, has less brightness than two separate pulses where there is insignificant overlapping light output. Therefore, a pulse will have greater light output on its own than when preceded or followed by another sufficiently adjacent pulse. With an ever increasing number of pulses the light output tends to saturate. In addition, the polarization charge imbalance likewise contributes to the abrupt changes in light output.

The present inventors when attempting to develop an improved gray scale technique based upon multiple different amplitudes encountered at least three seemingly unsurmountable barriers, namely, the aging phenomena in the range of 100 to 1000 hours, the gray shade memory characteristics in the range of a few seconds to a few hours, and the brightness decrease due to overlapping light output from pulses within a frame. Accordingly, any attempt to use an increasing number of individual pulses with a range of amplitudes would not seemingly be a feasible technique to achieve a reliable gray scale display.

Figure 10:
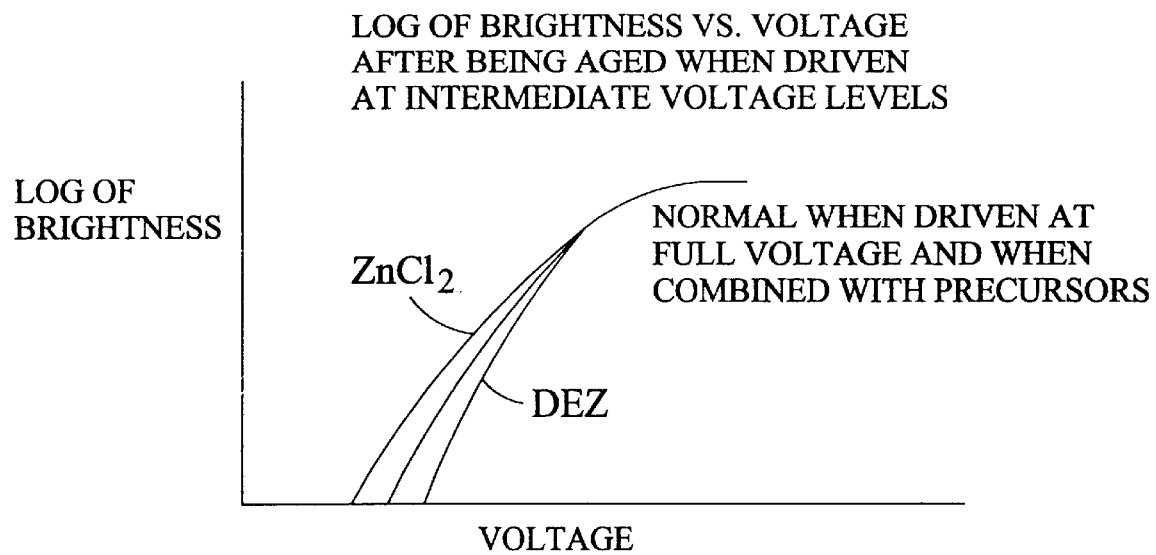
FIG. 10 is a graph of the brightness versus voltage characteristics of a phosphor manufactured using $ZnCL_2$ and DEZ as precursors.

Initially the present inventors in a determined effort to solve the seemingly unsurmountable barriers attempted to develop a solution to the intermediate voltage based aging phenomena. Initially, the phosphor material ZnS:Mn may be manufactured using multiple different precursor techniques. One technique to manufacture ZnS:Mn involves the use of a $ZnCl_2$ precursor ($ZnCl_2+H_2S=ZnS+2HCl$). During testing of ZnS:Mn using the $ZnCl_2$ precursor it was observed that its aging characteristics are poor at full voltage levels, and when driven at intermediate voltage Levels it tends to generally increase in brightness. Another technique to manufacture ZnS:Mn involves the use of DEZ ($Zn(CH_2CH_3)_2$ as a precursor. During testing of ZnS:Mn using the DEZ precursor it was observed that its aging characteristics are good at full voltage levels and when driven at intermediate voltage levels it tends to generally decrease in brightness. After characterizing the aging properties, where previously there would not have been any motivation to even characterize, the present inventors observed that the $ZnCl_2$ and the DEZ precursors resulted in opposing aging characteristics at intermediate voltage levels, as schematically illustrated in FIG. 10. With this observation the present inventors speculated that by manufacturing an electroluminescent phosphor material using both the $ZnCl_2$ and the DEZ precursors that the aging effects may be substantially canceled. When using both the precursors for the same electroluminescent phosphor material the aging characteristics were significantly improved.

With this improvement in the aging characteristics of electroluminescent phosphor material, the present inventors then considered the dichotomy of a single phosphor material manufactured using two precursors and the potential of an electroluminescent phosphor material having multiple light emitting phosphors (generally in an overlapping layered arrangement) providing the same improved aging results when driven with intermediate voltage levels. To the present inventors astonishment a display using ZnS:Mn phosphor and SrS:Ce phosphor, likewise has stable aging characteristics at intermediate voltage levels.

Figure 11:
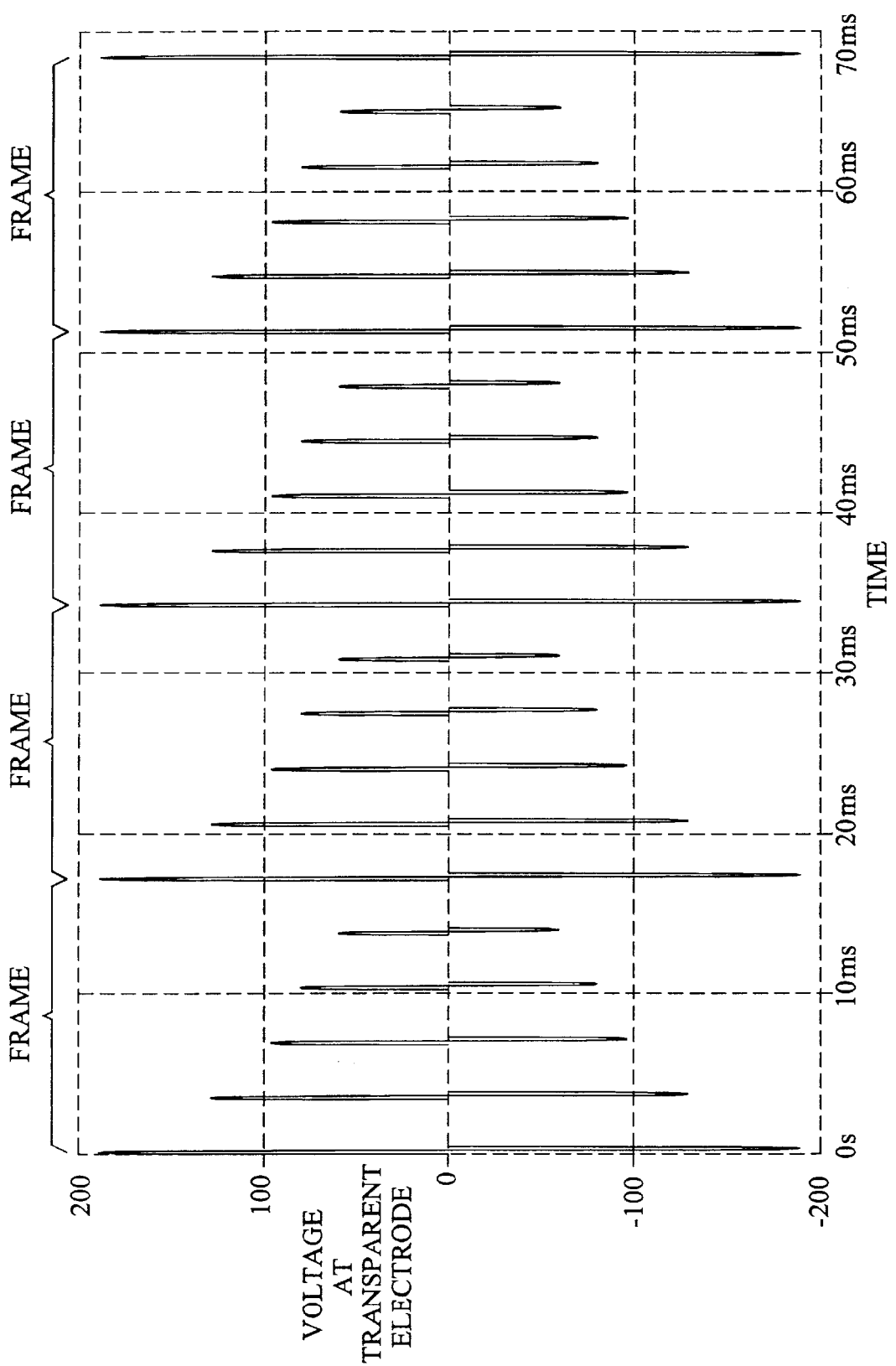
FIG. 11 is one embodiment of an exemplary gray scale of the present invention.

With a potential solution to the aging characteristics of the phosphor material the present inventors further investigated the remaining issues. Initially, the present inventors determined that using a set of individual pulses, each of which is provided during a respective subframe time period, will alleviate concerns with respect to overlapping light output from a set of pulses. It is to be understood that multiple pulses for a selected set of subframes may be used, if desired. Referring to FIG. 11, one embodiment of the present invention includes multiple single (or multiple) pulses of different amplitudes. While an improvement, the resulting image still does not have provide the high quality image desired by the present inventors.

Figure 12:
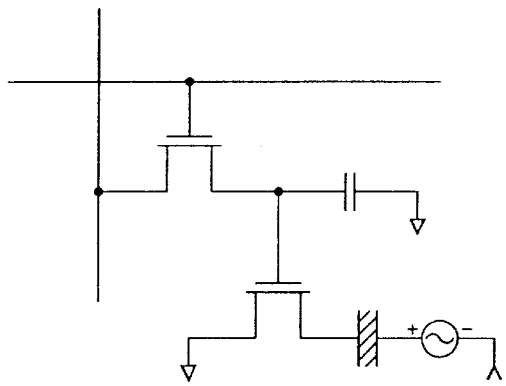
FIG. 12 illustrates the voltage imposed on the electroluminescent phosphor layer when the high voltage transistor is on and off.
Figure 12:
Figure 12:
Figure 12:
Figure 12:

With respect to the interaction between the bit planes the present inventors considered an unlikely source of the problem, namely, the high voltage DMOS transistor gating the electronics. Referring to FIG. 12, when the DMOS transistor is on, or otherwise selected, the voltage imposed across the electroluminescent phosphor of the pixel is generally sinusoidal, or otherwise generally (substantially) matches the voltage imposed on the transparent electrode 110. The symmetrical voltage imposed across the phosphor layer results in a symmetrical movement of polarization charge back and forth across the phosphor material. Accordingly, after a symmetrical voltage waveform is imposed across the phosphor material the polarization charge will return to its initial position within the phosphor material. When the DMOS transistor is off, or otherwise not selected, the voltage imposed across the electroluminescent phosphor layer is asymmetrical. Accordingly, after an asymmetrical voltage waveform is imposed across the phosphor material the polarization charge will be offset from its initial position within the phosphor material. Therefore, the different waveforms imposed across the phosphor material will result in a variable brightness output depending on the previous state of the polarization charge within the phosphor material.

Figure 13:
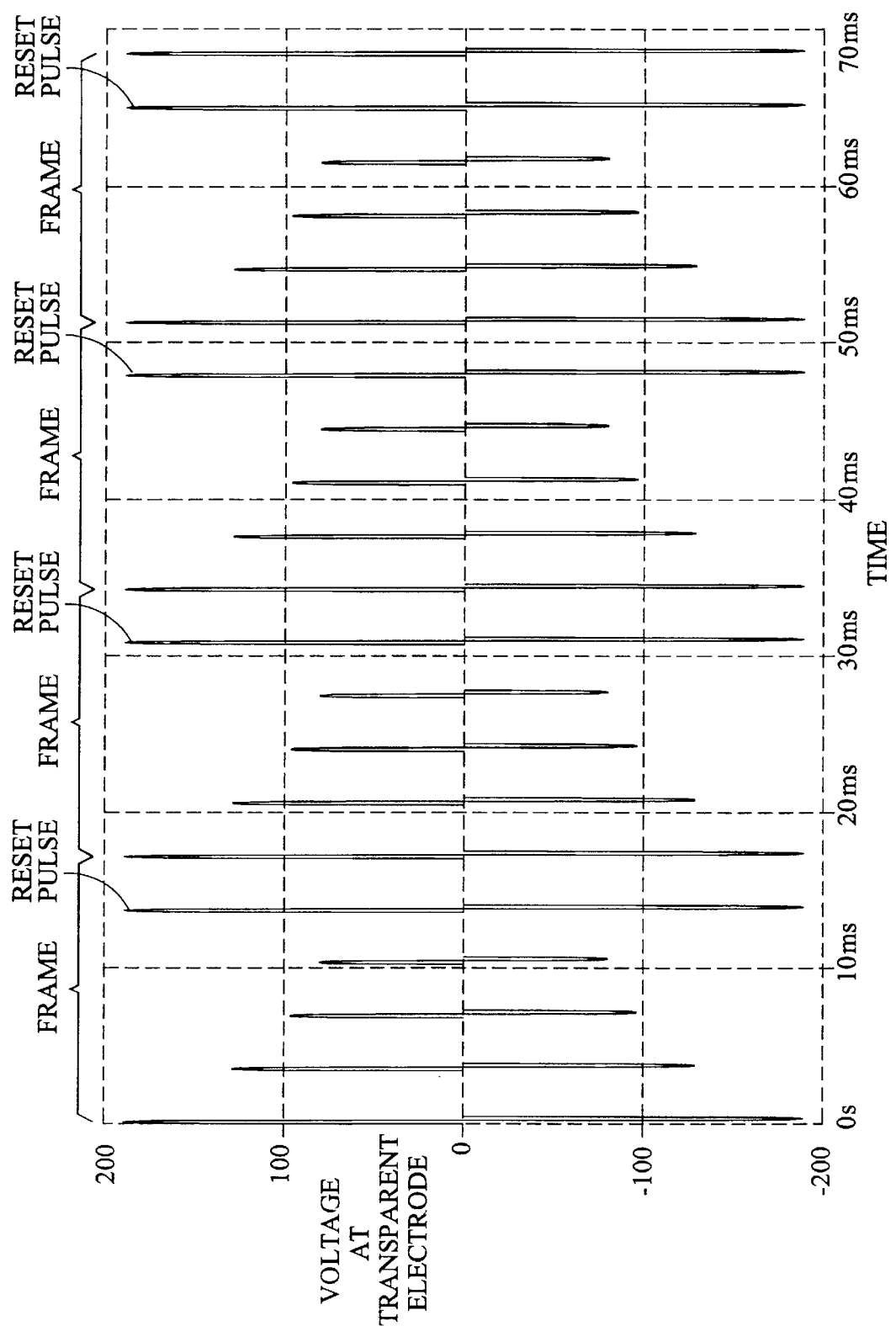
FIG. 13 illustrates another embodiment of an exemplary gray scale of the present invention.

Referring to FIG. 13, based upon this understanding of the characteristics of the phosphor material combined with the operation of the DMOS transistor, the present inventors determined that by incorporating a reset pulse between successive frames of an active matrix electroluminescent display with all the transistors turned "off" so that no light results, the polarization charge imbalance within the phosphor material may be reset to a known and predictable value. The reset pulse, when combined with a DMOS transistor, results in the movement of the polarization charge toward one side of the phosphor material. The positive portion of the voltage waveform determines the light brightness of the particular subframe, with a decreasing amplitude corresponding to a decreased brightness. In effect, each pulse (or set of pulses) is a separate subframe. Preferably, the pulses are sufficiently separated so that sufficient time is permitted so that the light output resulting from a particular pulse has time to substantially decay to zero. It is to be understood that the same general technique may be used with different transistors within the circuit layer, such as for example PMOS transistors. While an improvement, the reset pulse primarily results in a uniform first subframe, with the remaining subframes being of potentially different brightness outputs depending upon the previous subframes.

Figure 14:
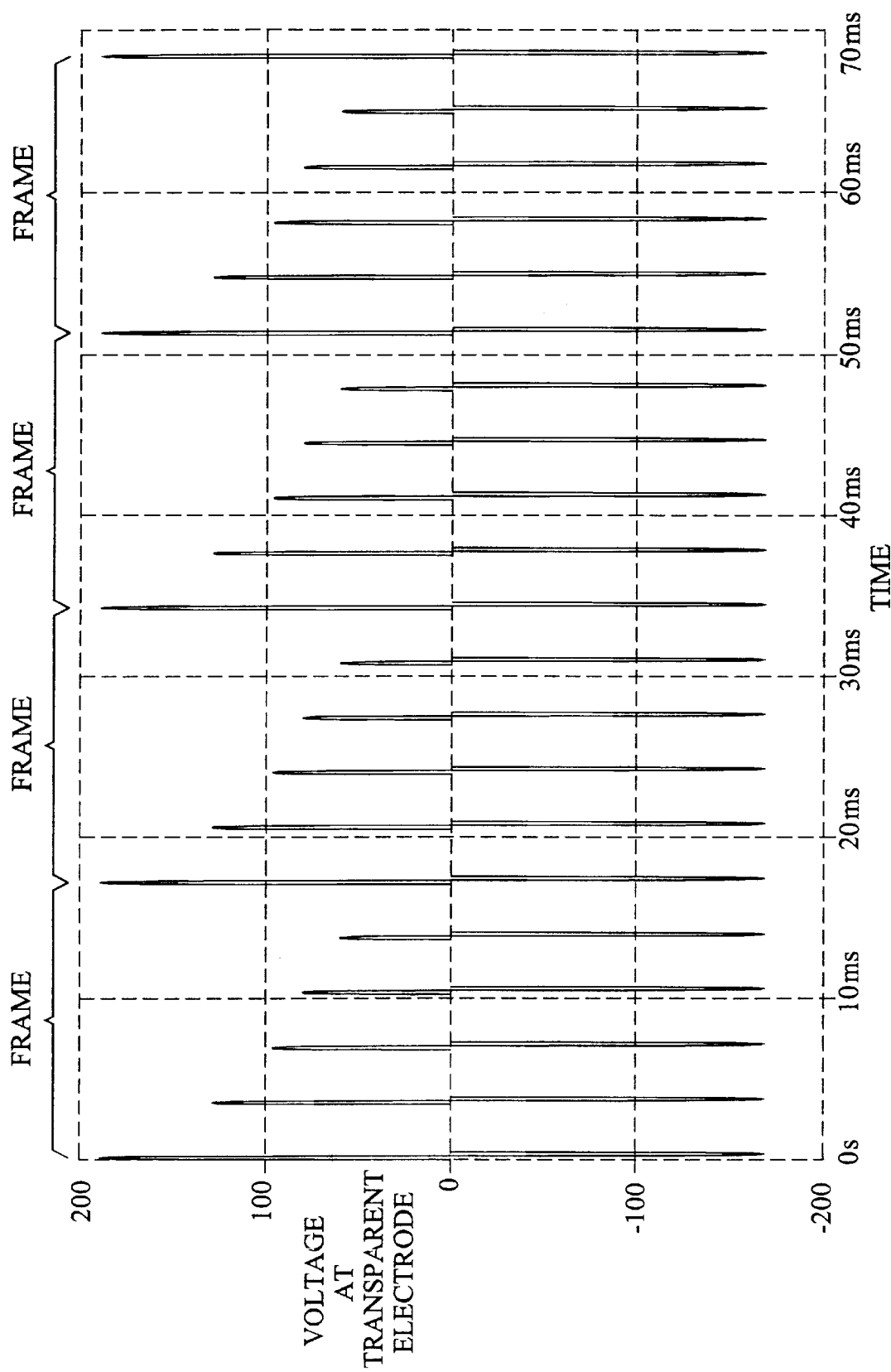
FIG. 14 illustrates yet another embodiment of an exemplary gray scale of the present invention.

Referring to FIG. 14, an improved technique, based upon this understanding of the characteristics of the phosphor material combined with the operation of the DMOS transistors, the present inventors determined that by incorporating a constant (or substantially constant) negative voltage to each subframe that the polarization charge imbalance within the phosphor material may be reset on a subframe by subframe basis to a predictable value. Multiple pulses may likewise be included within each or a selected set of subframes. One or more of the pulses of one or more of the subframes includes a sufficient positive or negative pulse. to reset, or otherwise bring back to substantially the same state, the polarization charge balance within the phosphor. It also to be understood that the negative voltage may be non-uniform if sufficient to reset the polarization charge within the phosphor material. In addition, if a P-type DMOS high voltage transistor is used then the substantially uniform negative voltage would in fact be a positive voltage. In this manner, the use of an asymmetrical voltage waveform results in resetting the polarization charge balance and likewise overcoming bit plane interactions within the gray scale technique.

Figure 15:
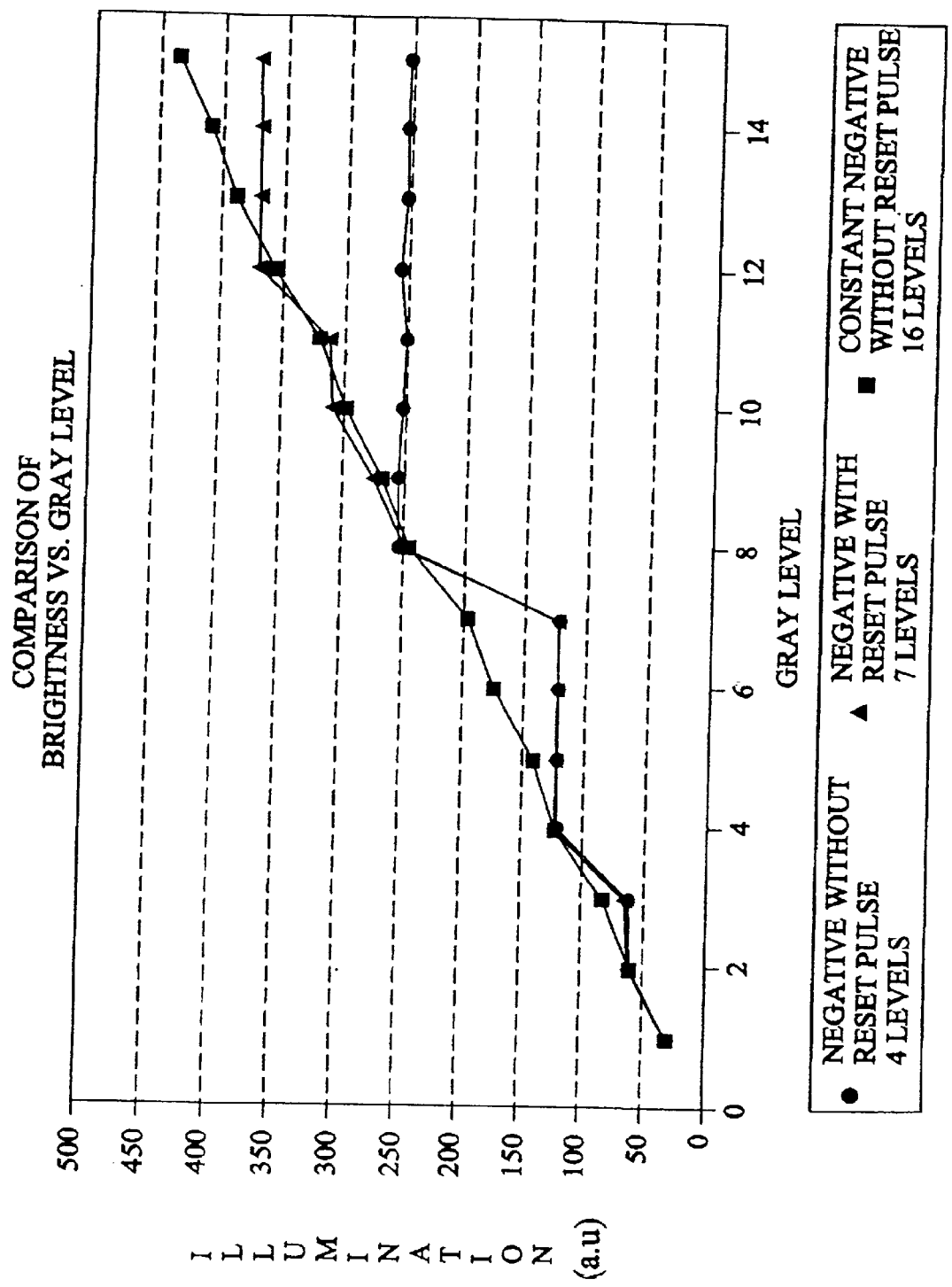
FIG. 15 illustrates a comparison between a binary pulse modulated technique, the technique of FIG. 13, and the technique of FIG. 14.

FIG. 15 illustrates the comparison between the techniques. The number of different gray levels achievable with a binary pulse modulated technique (1, 2, 4, 8) is limited. In comparison, the number of gray levels achievable using the technique of FIG. 13 is greater and more linear. Further, the technique of FIG. 14 includes even more gray levels and is substantially linear.

It is to be understood that alternative techniques may be used together with the improved phosphor material to drive the phosphor layer at intermediate voltage levels. One such technique involves providing an variable voltage level to the capacitor of the circuit element and then ramping a voltage provided to the high voltage transistor to switch the high voltage transistor at the desired time. This permits localized control over the voltage imposed across different portions of the phosphor layer to achieve intermediate voltage levels. In addition, the phosphor material may be used with traditional row and column based thin film electroluminescent devices, as described in the background hereof.

It is to be understood that the improved phosphors and improved driving schemes are not necessarily dependant upon one other being included in any particular device. As such, each provides an improvement of the existing state of the art and is an invention itself.

All references mentioned herein are hereby incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of illuminating an active matrix electroluminescent device to provide a gray scale display, said device comprising a first electrode layer comprising a plurality of individually addressable pixel electrodes, a second electrode layer, and a stack including at least a phosphor layer which produces light upon the application of an electric field across the phosphor layer and a dielectric layer, said stack being disposed between said first and second electrode layers, comprising the steps of:

(a) selecting a set of selected ones of said pixel electrodes with data signals during a first subframe time period of a frame;

(b) driving said second electrode layer during said first subframe time period with a first illumination signal having a first amplitude;

(c) selecting at least one of said set of said selected ones of said pixel electrodes with data signals during a subsequent subframe time period of said frame;

(d) driving said second electrode layer during said subsequent subframe time period with a subsequent illumination signal having a second amplitude, where said subsequent amplitude is different than said first amplitude;

(e) selecting at least one of said set of said selected ones of said pixel electrodes with data signals during a further subsequent subframe time period of said frame; and (f) driving said second electrode layer during said further subsequent subframe time period with a further subsequent illumination signal having a third amplitude, where said third amplitude is different than said first amplitude and said second amplitude.

2. The method of claim 1 further including the steps of repeating steps (e) and (f) for n subsequent subframe time periods until an entire frame of data has been written.

3. The method of claim 1 wherein there is a time delay between the execution of step (b) and the execution of step (d).

4. The method of claim 1 wherein said first illumination signal is a single pulse.

5. The method of claim 4 wherein said subsequent illumination signal is a single pulse.

6. The method of claim 5 wherein said further subsequent illumination signal is a single pulse.

7. The method of claim 1 wherein the luminescent output as a result of said first illumination signal substantially decays to zero prior to driving said second electrode layer with said subsequent illumination signal.

8. The method of claim 7 wherein the luminescent output as a result of said subsequent illumination signal substantially decays to zero prior to driving said second electrode layer with said further subsequent illumination signal.

9. The method of claim 8 wherein said first, subsequent, and further subsequent illumination signal signals are single pulses.

10. The method of claim 1 wherein said first, subsequent, and further subsequent illumination signals have a substantially constant maximum absolute value of the applied voltage.

11. The method of claim 1 wherein the polarization charge within said phosphor layer is substantially constant after said first subframe time period, said subsequent subframe time period, and said further subsequent subframe time period.

12. The method of claim 1 further comprising:

(a) repeating steps (e) and (f) of claim 1 until the end of said frame;

(b) repeating steps (a) through (f) of claim 1 for a subsequent frame; and (c) driving said second electrode layer between said frame and said subsequent frame with another illumination signal, where each pixel corresponding to each of said set of selected ones of said pixel electrodes has substantially no luminescence output as a result of step (c) of claim 1.

13. The method of claim 12 further comprising driving said second electrode layer between multiple different frames, where each pixel corresponding to each of said set of selected ones of said pixel electrodes has substantially no luminescence output as a result.

14. The method of claim 1 wherein said phosphor layer comprises ZnS:Mn manufactured using a plurality of precursors.

15. The method of claim 14 wherein said precursors comprise $ZnCl_2$ and DEZ.

16. The method of claim 1 wherein said phosphor layer comprises ZnS:Mn phosphor and SrS:Ce phosphor.

17. A method of illuminating an active matrix electroluminescent device to provide a gray scale display, said device comprising a first electrode layer comprising a plurality of individually addressable pixel electrodes, a second electrode layer, and a stack including at least a phosphor layer which produces light upon the application of an electric field across the phosphor layer and a dielectric layer, said stack being disposed between said first and second electrode layers, comprising the steps of:
  (a) selecting a set of selected ones of said pixel electrodes with data signals during a first subframe time period of a frame;
  (b) imposing an electric field across said phosphor layer during said first subframe time period having a first amplitude;
  (c) selecting at least one of said set of said selected ones of said pixel electrodes with data signals during a subsequent subframe time period of said frame;
  (d) imposing an electric field across said phosphor layer during said subsequent subframe time period having a second amplitude, where said subsequent amplitude is different than said first amplitude;
  (e) selecting at least one of said set of said selected ones of said pixel electrodes with data signals during a further subsequent subframe time period of said frame; and
  (f) imposing an electric field across said phosphor layer during said further subsequent subframe time period having a third amplitude, where said third amplitude is different than said first amplitude and said second amplitude.

18. The method of claim 17 further including the steps of repeating steps (e) and (f) for n subsequent subframe time periods until an entire frame of data has been written.

19. The method of claim 17 wherein there is a time delay between the imposing of step (b) and the execution of step (d).

20. The method of claim 17 wherein said electric field of step (b) is a single pulse.

21. The method of claim 20 wherein said electric field of step (d) is a single pulse.

22. The method of claim 21 wherein said electric field of step (f) is a single pulse.

23. The method of claim 17 wherein the luminescent output as a result of said electric field of step (b) substantially decays to zero prior to imposing said electric field of ste (d).

24. The method of claim 23 wherein the luminescent output as a result of said electric field of step (d) substantially decays to zero prior to imposing said electric field of step (f).

25. The method of claim 17 wherein said electric fields of steps (b), (d), and (f) have a substantially constant maximum absolute value.

26. The method of claim 17 wherein the polarization charge within said phosphor layer is substantially constant after said first subframe time period, said subsequent subframe time period, and said further subsequent subframe time period.

27. The method of claim 17 further comprising:
  (a) repeating steps (e) and (f) of claim 1 until the end of said frame;
  (b) repeating steps (a) through (f) of claim 1 for a subsequent frame; and
  (c) imposing an electric field across said phosphor layer between said frame and said subsequent frame, where each pixel corresponding to each of said set of selected ones of said pixel electrodes has substantially no luminescence output as a result of step (c) of claim 27.

28. The method of claim 27 further comprising imposing an electric field across said phosphor layer between multiple different frames, where each pixel corresponding to each of said set of selected ones of said pixel electrodes has substantially no luminescence output as a result.

29. The method of claim 17 wherein said phosphor layer comprises ZnS:Mn manufactured using a plurality of precursors.

30. The method of claim 29 wherein said precursors comprise $ZnCl_2$ and DEZ.

31. The method of claim 17 wherein said phosphor layer comprises ZnS:Mn phosphor and SrS:Ce phosphor.

32. A method of illuminating an active matrix electroluminescent device to provide a gray scale display, said device comprising a first electrode layer comprising a plurality of individually addressable pixel electrodes, a second electrode layer, and a stack including at least a phosphor layer comprised of ZnS:Mn phosphor and SrS:Ce phosphor which produces light upon the application of an electric field across the phosphor layer and a dielectric layer, said stack being disposed between said first and second electrode layers, comprising the steps of:
  (a) selecting a set of selected ones of said pixel electrodes with data signals during a first subframe time period of a frame;
  (b) imposing an electric field across said phosphor layer during said first subframe time period having a first amplitude;
  (c) selecting at least one of said set of said selected ones of said pixel electrodes with data signals during a subsequent subframe time period of said frame; and
  (d) imposing an electric field across said phosphor layer during said subsequent subframe time period having a second amplitude, where said subsequent amplitude is different than said first amplitude.

33. The method of claim 32 further including the steps of repeating steps (c) and (d) for n subsequent subframe time periods until an entire frame of data has been written.

34. The method of claim 32 wherein there is a time delay between the imposing of step (b) and the imposing of step (d).

35. The method of claim 32 wherein said electric field of step (b) is a single pulse.

36. The method of claim 35 wherein said electric field of step (d) is a single pulse.

37. The method of claim 32 wherein the luminescent output as a result of said electric field of step (b) substantially decays to zero prior to imposing said electric field of step (d).

38. The method of claim 32 wherein said electric fields of step (b) and (d) have a substantially constant maximum absolute value of the applied voltage.

39. The method of claim 32 wherein the polarization charge within said phosphor layer is substantially constant after said first subframe time period, and said subsequent subframe time period.

40. The method of claim 32 wherein said phosphor layer comprises ZnS:Mn manufactured using a plurality of precursors.

41. The method of claim 40 wherein said precursors comprise $ZnCl_2$ and DEZ.

* * * * *